United States Patent
Netreba et al.

(10) Patent No.: US 10,033,188 B2
(45) Date of Patent: Jul. 24, 2018

(54) METHOD AND APPARATUS FOR CONTROLLING POWER PRODUCTION IN DISTRIBUTION GRIDS

(71) Applicant: Siemens Aktiengesellschaft, Munich (DE)

(72) Inventors: Kirill Netreba, Petersburg (RU); Yury Chistyakov, Petersburg (RU)

(73) Assignee: Siemens Aktiengesellschaft, Munich (DE)

( * ) Notice: Subject to any disclaimer, the term of this patent is extended or adjusted under 35 U.S.C. 154(b) by 154 days.

(21) Appl. No.: 15/025,097

(22) PCT Filed: Sep. 25, 2013

(86) PCT No.: PCT/RU2013/000835
§ 371 (c)(1),
(2) Date: Mar. 25, 2016

(87) PCT Pub. No.: WO2015/047122
PCT Pub. Date: Apr. 2, 2015

(65) Prior Publication Data
US 2016/0241038 A1    Aug. 18, 2016

(51) Int. Cl.
*H02J 3/38* (2006.01)
*H02M 7/44* (2006.01)
(Continued)

(52) U.S. Cl.
CPC ............. *H02J 3/382* (2013.01); *H02J 3/383* (2013.01); *H02J 3/386* (2013.01); *H02J 3/387* (2013.01);
(Continued)

(58) Field of Classification Search
CPC .. H02J 3/382; H02J 3/383; H02J 3/387; H02J 13/006; H02J 2003/007; Y02E 40/70; Y02E 60/76; Y04S 40/22
(Continued)

(56) References Cited

U.S. PATENT DOCUMENTS

| | | | |
|---|---|---|---|
| 8,410,634 B2 * | 4/2013 | Park | H02J 3/32 307/65 |
| 8,892,264 B2 * | 11/2014 | Steven | G06Q 50/06 700/286 |
| 9,608,446 B2 * | 3/2017 | Chang | H02J 3/28 |
| 2012/0010757 A1 | 1/2012 | Francino | |

OTHER PUBLICATIONS

Bhavya Gudimetla et al; "Integration of Micro-Scale Photovoltaic Distributed Generation on Power Distribution Systems: Dynamic Analyses"; XP-002730219; DOI:10.1109/TDC.2012.6281593; ISBN:978-1-4673-1934-8; 2012.
(Continued)

*Primary Examiner* — Dinh T Le
(74) *Attorney, Agent, or Firm* — Cozen O'Connor

(57) ABSTRACT

A method and apparatus for controlling power production in a distribution grid, wherein a technical result consists in increasing the efficiency of responding to an incoming grid state by using a database storing previous grid states and solutions for the previous grid states when solving an optimization problem, where a set of grid parameters is initially obtained to determine the incoming grid state, the incoming grid state is then compared to the previous grid states stored in the database, and if at least one previous grid state similar to the incoming grid state exists in the database, its solution is selected as a solution for the incoming grid state, and the indication of the amount of power to be produced, which is represented by the selected solution for the incoming grid state, is sent to power producers to provide a desired power level for power consumers.

10 Claims, 3 Drawing Sheets

(51) Int. Cl.
  *H02J 3/00* (2006.01)
  *H02J 13/00* (2006.01)
(52) U.S. Cl.
  CPC .......... *H02M 7/44* (2013.01); *H02J 13/0006* (2013.01); *H02J 2003/007* (2013.01); *Y02E 10/563* (2013.01); *Y02E 40/72* (2013.01); *Y02E 60/76* (2013.01); *Y04S 10/123* (2013.01); *Y04S 40/22* (2013.01)
(58) Field of Classification Search
  USPC .............................................. 327/26; 307/26
  See application file for complete search history.

(56) References Cited

OTHER PUBLICATIONS

Wang R., et al: Research on the reactive power control of grid-connected inverter of distributed generation system based on genetic algorithm, 3rd IEEE Conference on Industrial Electronics and Applications (2008), 1096-1099).

Ausavanop O. et al: Coordination of dispatchable distributed generation and voltage control devices for improving voltage profile by Tabu Search, 8th International Conference on Electrical Engineering/Electronics, Computer, Telecommunications and Information technology (ECTI-CON) (2011), 869-872).

Prodanovic M. et al: Harmonic and reactive power compensation as ancillary services in inverter-based distributed generation, IET Generation, Transmission & Distribution, vol. 1, No. 3, pp. 432-438, 2007).

Chistyakov Y. et al: "Combined central and local control of reactive power in electrical grids with distributed generation", Energy Conference and Exhibition (ENERGYCON), 2012).

Shalwala R.A. et al: Voltage control scheme using Fuzzy Logic for residential area networks with PV generators in Saudi Arabia, IEEE PES Innovative Smart Grid Technologies (ISGT) (2011), 1-8).

Turitsyn K. et al, "Options for control of reactive power by distributed photovoltaic generators", Proceedings of the IEEE, vol. 99, No. 6, pp. 1063-1073, Jun. 2011).

\* cited by examiner

METHOD AND APPARATUS FOR CONTROLLING POWER PRODUCTION IN DISTRIBUTION GRIDS

CROSS-REFERENCE TO RELATED APPLICATIONS

This is a U.S. national stage of application No. PCT/RU2013/000835, filed on 25 Sep. 2013, the content of which is incorporated herein by reference in its entirety.

BACKGROUND OF THE INVENTION

1. Field of the Invention

The present disclosure relates to power production in a distribution grid and, more specifically, to a method and apparatus for controlling power production in a distribution grid including a plurality of power producers and a plurality of power consumers, and also relates to a computer-readable medium comprising computer instructions which, when executed by a computer or processor, cause the computer or processor to perform the method.

2. Description of the Related Art

A distribution grid is used to provide a certain amount of electrical power to consumers which have a lack of electrical power due to different reasons, such as voltage sags and swells. Such extra electrical power is taken from different electrical power sources connected to a distribution grid. These electrical power sources are typically direct current sources. Therefore, given that alternating current is used in the distribution grid, it is necessary to perform direct current-to-alternating current conversion prior to providing a desired amount of electrical power to the consumers being in need. For this purpose, i.e., to perform such a conversion process, electrical power converters, also known as inverters, are used. The inverters are placed at the output of the electrical power sources and, thus, are configured to control the amount of electrical power to be supplied into the distribution grid and, consequently, the respective consumers. The amount of electrical power to be provided by each inverter is determined by special control information transmitted to the inverter.

At present, controllable power production in distribution grids including solar battery modules as power producers is of great interest. The solar battery modules are provided with photovoltaic inverters. Control information is transmitted to the photovoltaic inverters to let them know how much power should be supplied into one or more parts of the distribution grid to provide a desired power level for the consumers. However, high-penetration levels of distributed photovoltaic generation in such a distribution grid present several challenges for distribution utilities. For example, the amount of power produced by the solar battery modules in one part of the distribution grid at which there is a lot of solar irradiation can be more than the amount of power produced by the solar battery modules in another part of the distribution grid where there is no or little solar irradiation. Furthermore, the level of solar irradiation can increasingly and temporally change in each part of the distribution grid due to rapidly varying solar irradiation. As a result of this, the voltage sags and swells occur, which cannot be compensated for by slowly responding utility equipment, resulting in a degradation of power quality.

The control of power provided by each photovoltaic inverter gives an opportunity and a new tool for distribution utilities to optimize the performance of the distribution grids, such as by solving optimization problems. The task here is to design an appropriate control scheme for power distribution that will be fast and accurate at the same time. The solution of full optimization problems in such tasks requires a lot of computation time due to a large number of varying parameters and interdependent functions to optimize. However, such a solution will likely be no longer up-to-date when it will be obtained, due to fast changes in production and/or consumption in the distribution grid.

In order to provide better performance of the distribution grid, each inverter can be controlled locally, according to its own measurements (see M. Prodanovic, K., De Brabandere, J, Van den Keybus, T. Green, and J. Driesen, "Harmonic and reactive power compensation as ancillary services in inverter-based distributed generation", IET Generation, Transmission & Distribution, vol. 1, no. 3, pp. 432-438, 2007), or can be controlled by a central supervising unit (see K. Turitsyn, P. Sulc, S. Backhaus, and M. Chertkov, "Options for control of reactive power by distributed photovoltaic generators", Proceedings of the IEEE, vol. 99, no. 6, pp. 1063-1073, June 2011), Both approaches present drawbacks, e.g., the local approach exhibits suboptimal performance due to the lack of coordination between agents, and the centralized approach scales badly with the number of devices in the distribution grid, and slowly solves large-scale optimization problems.

SUMMARY OF THE INVENTION

It is therefore an object of the present invention to provide a power control scheme which is capable of solving the above-mentioned prior art drawbacks.

This and other objects and advantages are achieved in accordance with the invention by providing a method for controlling power production in a distribution grid that can include, among others, a plurality of power producers and a plurality of power consumers, a controller operatively connected to the distribution grid and based on a set of grid parameters (such as voltages, the amounts of produced and consumed power), determines an incoming grid state, where the controller comprises a memory that stores a database composed of "state-solution" pairs, where each of the "state-solution" pairs characterize a previous grid state and a respective solution for the previous grid state, and where each solution represents an indication of an amount of power to be produced by the power producers to provide a desired power level for the power consumers in the distribution grid.

In addition, the controller checks whether the incoming grid state is similar to at least one of the previous grid states in the database and if the check result is "yes", selects the solution for the at least one previous grid state as a solution for the incoming grid state.

The controller now sends the indication that is represented by the selected solution for the incoming grid state to the power producers.

In one embodiment, the power producers are solar battery modules provided with photovoltaic inverters. Here, the indication represented by the selected solution for the incoming grid state is sent by the controller to each of the photovoltaic inverters.

If the check performed by the controller shows that there are no similar previous grid states in the database, then the controller finds a new local optimum solution for the incoming grid state using a simple approach, and finds a new global optimum solution for the incoming grid state using a detailed approach.

The simple approach is based on gradient algorithms and a simplified liner model for the distribution grid, while the detailed approach is based on soft compute techniques and an Ml model for the distribution grid.

In accordance with one embodiment, the steps of finding the local optimum solution and the global optimum solution can be performed in parallel or in sequence.

In accordance with another embodiment, when the new global optimum solution is found, the incoming grid state and the new global optimum solution for the incoming grid state are stored in the database.

In accordance with yet another embodiment, each "state-solution" pair in the database is provided with a certain identifier, and the check comprises searching for a similar solution for the incoming grid state by using identifiers for "state-solution" pairs in the database.

It is also an object of the present invention to provide a computer-readable medium that stores computer program instructions which, when executed by a computer or processor, cause the computer or processor to perform the method in accordance with disclosed embodiments.

It is also an object of the present invention to provide an apparatus for controlling power production in a distribution grid is provided, where the apparatus comprises a processor and a memory connected to the processor. The memory stores a database composed of "state-solution" pairs. Each of the "state-solution" pairs characterizes a previous grid state and a respective solution for the previous grid state. Each solution represents an indication of an amount of power to be produced by the power producers to provide a desired power level for the power consumers in the distribution grid. The memory further stores computer-readable instructions which, when executed by the processor, cause the processor to determine, based on a set of grid parameters, an incoming grid state, check whether the incoming grid state is similar to at least one of the previous grid states in the database, select the solution for said at least one previous grid state as a solution for the incoming grid state if the check result is "yes", and send the indication that is represented by the selected solution for the incoming grid state to the power producers.

With the control of power production in accordance with the present invention, it is possible to increase the efficiency of responses to an incoming grid state by using a database storing previous grid states and solutions for the previous grid states when solving an optimization problem. In particular, the usage of the database allows avoiding additional time-consuming computations for finding an optima) solution for rapidly changing grid states. In view of this, it is possible to achieve the saving of power and the minimization of loss in the distribution grid.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The accompanying drawings are presented to aid in the description of embodiments of the present invention and are provided solely for illustration of the embodiments and not limitation thereof, in which.

DETAILED DESCRIPTION OF THE EXEMPLARY EMBODIMENTS

Figure 1:
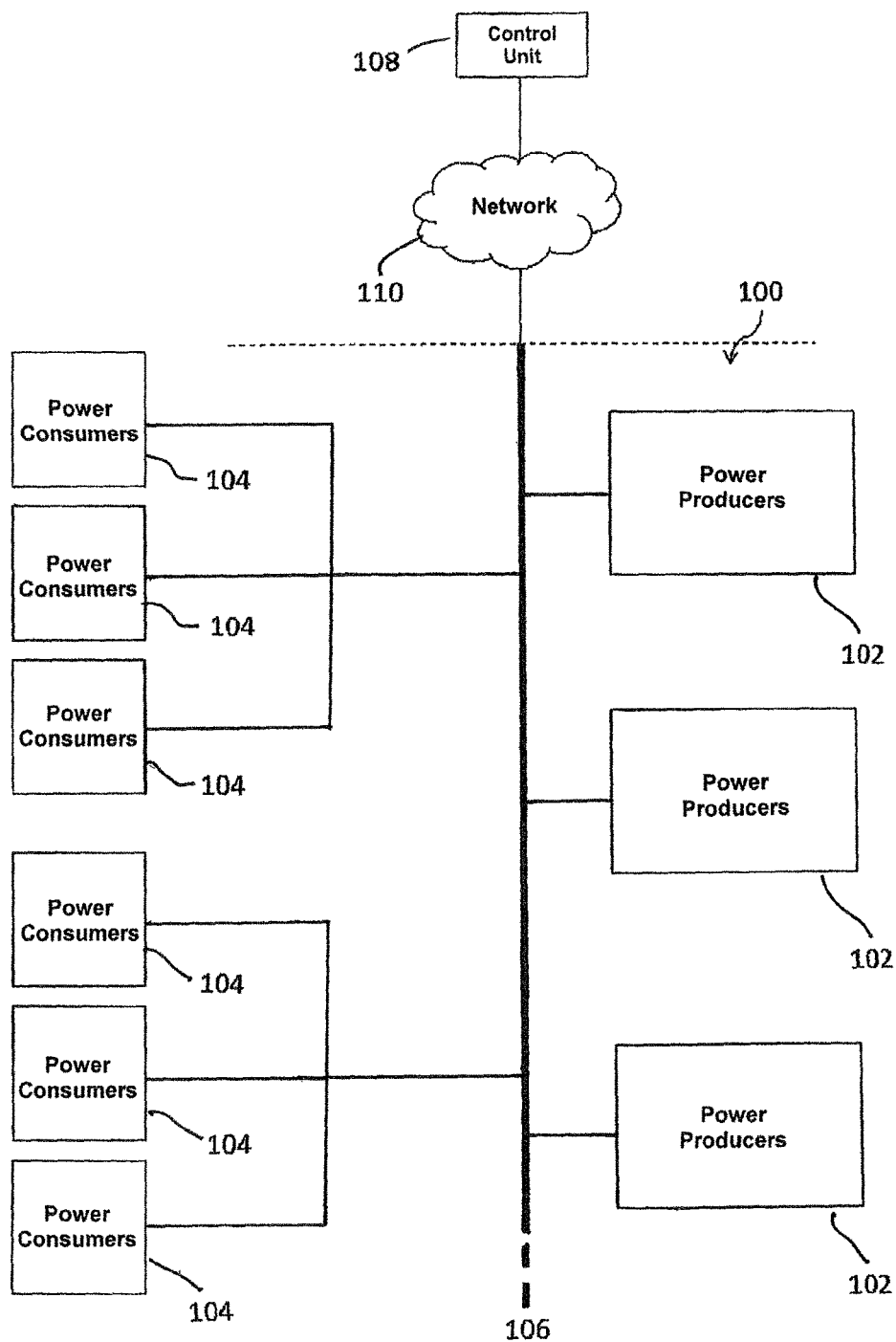
FIG. 1 illustrates an exemplary distribution grid in which power production is controlled in accordance with an exemplary embodiment of the present invention.

Like reference numbers and designations in the various drawings indicate like elements.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure, For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

The present disclosure relates to a methodology for controlling power production in distribution grids in order to provide an adequate power level for power consumers. The application of such methodology will be especially useful and advantageous in a distribution grid with a rapidly varying power level due to different internal and external factors. As a non-limiting example, this methodology can be implemented in a distribution grid based on photovoltaic power generation. If solar irradiation is non-uniform and/or rapidly varying within the distribution grid, it will result in situations when root-mean-square voltages in some parts of the distribution grid will be below a nominal voltage by 10 to 90% for 0.5 cycle to 1 minute (which is known as voltage sags) or will exceed the nominal voltage by 10 to 80% for 0.5 cycle to 1 minute (which is known as voltage swells). The voltage sags and swells will cause the degradation of power quality determining the fitness of electrical power to the power consumers. In other words, the power consumers cannot operate correctly in this case. In order to compensate for the voltage sags and swells, in accordance with one embodiment of the present invention, power producers (e.g., solar battery modules) connected to the distribution grid can be instructed so as to supply a certain amount of power into those parts of the distribution grid that suffer from the voltage sags and swells, thereby smoothing power maxima and minima and, consequently, providing an adequate power level or power quality for the power consumers.

As used herein, the term "power distribution" should be understood as a process that is used to move electricity (power) from locations where it is produced to one or more consumers needing the power. In turn, the term "(power) distribution grid" should be construed as a network of interconnecting transmission lines that allow utilities to transmit and distribute power from power producers to power consumers. In general, the distribution grid implies a system that is designed to keep power constantly on call so that it can meet demand. One example of distribution grids is given in FIG. 1.

Referring to FIG. 1, an exemplary distribution grid 100 in which power production is controlled in accordance with the present invention is provided. The distribution grid 100 includes power producers 102, power consumers 104, and a trunk main 106 via which the power producers 102 and the power consumers 104 are interconnected.

The power producers 102 can use, without limitation, different renewable sources of energy, such as solar irradiation, wind, or water, and exhaustible sources of energy, such as fossil fuels, or nuclear fuels, in order to produce electrical power. In one embodiment, the power producers 102 can be implemented as solar battery modules which can be spatially spaced within the distribution grid 100 or can be combined in one or more solar farms in one or more parts of the distribution grid 100 (e.g., where there is a lot of sun irradiation). All other possible implementations of the power producers 102, which use the above-mentioned and other appropriate sources of energy, should be apparent to those skilled in the art. It is assumed that the present invention includes all of such implementations of the power producers 102.

The power consumers 104 can be, without limitation, any devices that need electrical power for their operation. Examples of the power consumers 104 can include different industrial and household equipment. It should also be noted that the power customers 104 can also represent power stations and substations that use power supplied from the power producers 102 to distribute the power within the local area of the distribution grid 100. All other possible implementations of the power customers 102 should be apparent to those skilled in the art. It is assumed that the present invention includes all of such implementations of the power customers 102.

The trunk main 106 is implemented herein as a line used to transmit electrical power to one or more distributing points (i.e., the power consumers 104) from the power producers 102. Therefore, the trunk main 106 can have multiple branch lines, each connecting the trunk main 106 to one power consumers 104 or a separate group of the power consumers 104.

Although FIG. 1 illustrates a certain number of different elements in the distribution grid 100, it should be apparent that more or less elements can be used in the distribution grid 100, depending on particular applications. Furthermore, interconnections between the power producers 102 and the power consumers 104 can be implemented in any other manner suitable for power distribution in the distribution grid 100.

FIG. 1 also illustrates a control unit 108 operatively connected to the distribution grid 100. The control unit 108 is configured to control power production in the distribution grid 100 by sending respective control information about power production to each of the power producers 102. The connection between the distribution grid 100 and the control unit 108 is established via a network 110. The network 110 can be wired or wireless. All appropriate types of wired, or wireless communication between different devices are known from the prior art and therefore will be omitted, here.

Figure 2:
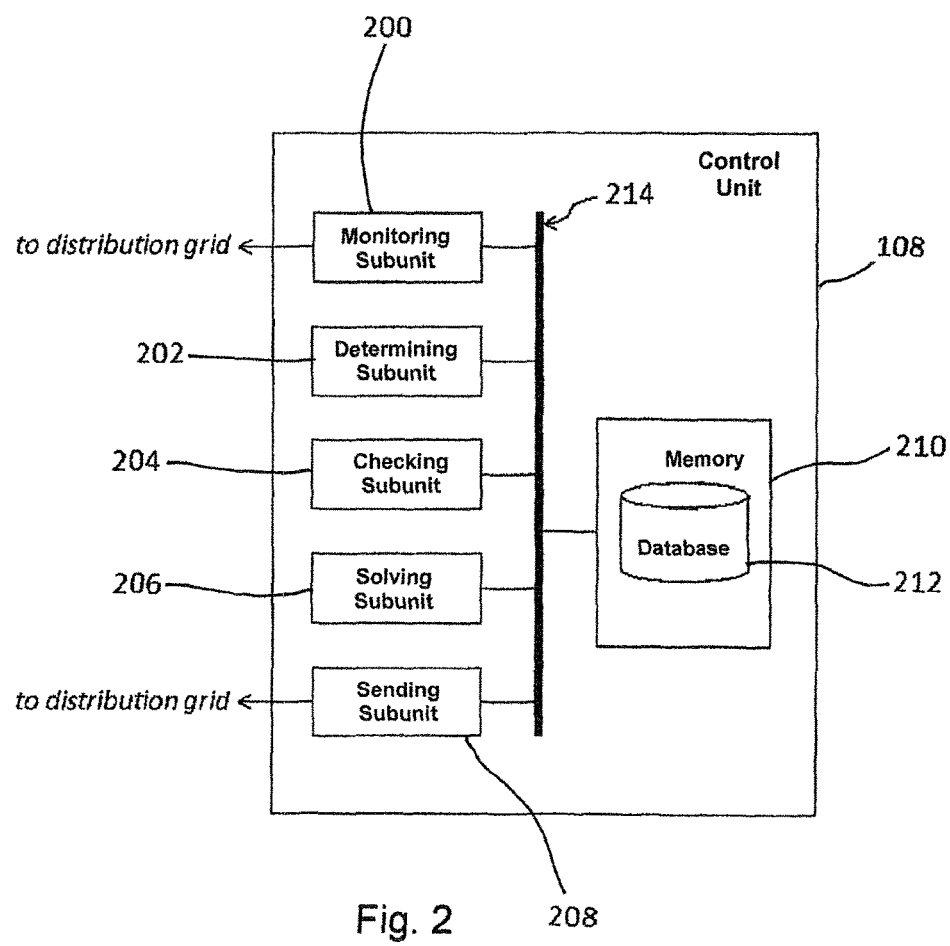
FIG. 2 illustrates a block diagram of an apparatus for controlling power production in the distribution grid of FIG. 1 in accordance with an exemplary embodiment of the present invention.

FIG. 2 is a detailed description of the control unit 108. As shown in FIG. 2, the control unit 108 includes a monitoring module 200, a determining subunit 202, a checking subunit 204, a solving subunit 206, a sending subunit 208 and a memory 210. All subunits of the control unit 108 are interconnected via a bus line 214. The bus line 214 serves as a feed line and a transmission line simultaneously. In other embodiments, the control unit 108 can be also implemented as having two bus lines, with one bus line serving as a feed line and another bus line serving as a transmission line, or as having multiple bus lines, each having certain one or more functions in the control unit 108.

Furthermore, the control unit 108 can be implemented as an autonomous or nonvolatile module or device, and in this case the bus line 214 can be connected to a battery (e.g., a solar battery) or other energy storage devices, in order to feed the subunits of the control unit 108. Such energy storage devices can be implemented as part of the control unit 108 or as separate devices connected to the control unit 108. It should also be noted the control unit 108 can be powered by multiple storage devices, and each of the multiple storage devices can feed one or more of the subunits of the control unit 108 through one or more bus lines like bus line 214. At the same time, the control unit 108 can be implemented as a non-autonomous or volatile module or device and, in this case, the bus line 214 can be connected to an electrical grid (tike the distribution grid 100) to feed the subunits of the control line 108.

The monitoring subunit 200 is also connected to the distribution grid 100 via network 110 and is configured to monitor grid parameter variations in time (e.g. in the form of data tables, graphs, or diagrams). The grid parameters can include, without limitation, root-mean-square voltage and/or current amplitudes, and/or amounts of consumed and/or produced power in one or more parts of the distribution grid 100, or other suitable parameters necessary for determining an incoming grid state. The term "incoming grid state" should be interpreted herein as a future state in which a grid (in this case, the distribution grid 100) will have a certain set of parameters. The monitoring subunit 200 can measure the grid parameter variations in time by itself or can receive such variations from any other device(s) via the network 110 or any other wireless network appropriate wired or wireless network (in the case of the wireless network, the monitoring subunit 200 acts as a receiver). When the grid parameter variation for a certain period of time is obtained, the monitoring subunit 200 is configured to send the grid parameter variation to the determining subunit 202.

The determining subunit 202 is configured to determine the incoming grid state by analyzing the set of grid parameters obtained from the monitoring subunit 200. To accomplish this, the determining subunit 202 performs different known prognosis methods (see, for example, Y. Chistyakov, E. Kholodova, K. Netreba, A. Szabo, M. Metzger, "Combined central and local control of reactive power in electrical grids with distributed generation", Energy Conference and Exhibition (ENERGYCON), 2012), When the incoming grid state is determined, the determining subunit 202 is further configured to send information on it to the checking subunit 204.

The checking subunit 204 is configured to check whether the determined incoming grid state is similar to one or more of the previously observed grid states. For this purpose, the checking subunit 204 performs access to a database 212 stored in the memory 210 through the bus line 214. The database 212 is composed of "state-solution" pairs, each characterizing a previous grid state and a respective solution for the previous grid stale. Each solution represents an indication of an amount of power to be provided by the power producers 102 to achieve a desired power level for the power consumers 104 in the distribution grid 100.

In one embodiment, the database 212 can be implemented as a table having two columns, with one column comprising previous grid states, i.e., different sets of previous grid parameters obtained by the monitoring subunit 200 during or for a certain period of time, and another column comprising respective solutions for the previous grid states.

In other embodiment, the database 212 can be implemented as a table having N columns, where N is a positive integer. Here, each of N−1 columns is intended to store only one or more of all types of the previous grid parameters defining the previous grid states (for example, column 1 can comprise voltage amplitudes, column 2—the amount of consumed power, column 3—the amount of produced power, etc.), and the last one column has the solutions for the previous grid states.

Furthermore, each "state-solution" pair in the database 212 can be further provided with a respective identifier, and the checking subunit 204 can be further configured to search for similar previous grid states by using these identifiers. In particular, such an identifier can consist of a different set of numerical and alphabetical characters that make it easy to perform the above-mentioned search. As a non-limiting example, the identifier can be presented as follows: "xxVyy-CPzzPP", where the first three characters "xxV" indicate the root-mean-square voltage "V" equal to "xx" (e.g., 20 V), the next three characters "yyCP" indicate the amount of consumed power "CP" equal to "yy" (e.g., 20 W), and the last three characters indicate the amount of produced power "PP" equal to "zz" (e.g., W). If, for example, the incoming grid state is thus predicted to be characterized by the following grid parameters: the voltage amplitude—20 V, the amount of consumed power—20 W, the amount of produced power—20 W, then a similar previous grid can be quickly found (if it exists in the database 212) by using the identifier "20V20CP20P". It should be apparent to those skilled in the art that the length of the identifier as well as character selection and position in the identifier can be changed depending on particular applications (e.g., if the amount of consumed power is a three-digit number, it will be reflected as "yyyCP"). Those skilled in the art should also understand that the identifier can take other forms that facilitate the process of searching similar previous grid states in the database 212. In addition, the identifiers for the "state-solution" pairs can be comprised in a separate column (if the database 212 is implemented as a table), so that each "state-solution" pair has an adjacent respective identifier.

Positive and Negative Check Results

If the checking subunit 204 finds at least one similar previous grid state for the incoming grid state (the check result is "YES"), the checking subunit 204 sends an instruction to the solving subunit 206 to select a respective solution for the at least one previous grid state as a solution for the incoming grid state. Once such a selection is performed, the solving subunit 206 is further configured to notify the sending subunit 208 about the selected solution for the incoming grid state.

The sending solution 210 is configured to send the indication represented by the selected solution for the incoming grid state via the network 110 to the power producers 102 located in the distribution grid 100. With the indication, each of the power producers 102 provides that amount of power necessary to achieve an adequate power level for the power consumers 104.

If the checking subunit 204 does not find at least one similar previous grid state for the incoming grid state (the check result is "NO"), the checking subunit 204 sends an instruction to the solving subunit 206 to find a new solution for the incoming grid state determined by the determining subunit 202. To achieve this, the checking subunit 204 is configured to solve an optimization problem directing to determining the amount of power the power producers 102 should provide to the power consumers 104 being in need of power.

There are two possible solutions for the above-defined optimization problem, namely a local optimum solution and a global optimum solution. In the context of the present disclosure, the term "local optimum solution" should be understood as a solution that is optimal (either maximal or minimal) within a neighboring set of candidate solutions. On the other hand, in the context of the present specification, the term "global optimum solution" should be understood as a solution that is optimal among all possible solutions, not just those in a particular neighborhood of values. Given the aforesaid, it should be already apparent that the local optimum solution for the incoming grid state is found faster than the new global optimum solution for the incoming grid state.

In Accordance with one embodiment, the solving subunit 206 is configured to find the local and global optimum solutions for the incoming grid state in parallel or in turn. As stated above, the local optimum solution needs less time to be found by the solving subunit 206 than the global optimum solution. As a result, the solving subunit 206 notifies the sending subunit 208 about the local optimum solution earlier than about the global optimum solution. In view of this, the indication of the amount of power to be provided by the power producers 102, which is provided by the local optimum solution, is sent by the sending subunit 208 to each of the power producers 102 in the first place.

Subsequently, when the global optimum solution is found by the solving subunit 206 and if the incoming grid state remains unchanged, the global optimum solution will replace the local optimum solution for each of the power producers 102.

Optimization approaches by which the solving subunit 206 finds the local and global optimum solutions are known from the prior art and can include, without limitation, approaches based on a genetic algorithm (see, e.g., Wang R., Lin F., You X., and Zheng T. Q., Research on the reactive power control of grid-connected inverter of distributed generation system based on genetic algorithm, 3rd IEEE Conference on Industrial Electronics and Applications (2008), 1096-1099), fuzzy logic (see, e.g., Shalwala R. A. and Bleijs J. A. M., Voltage control scheme using Fuzzy Logic for residential area networks with PV generators in Saudi Arabia, IEEE PES Innovative Smart Grid Technologies (ISGT) (2011), 1-6), Tabu search algorithm (see, e.g., Ausavanop O. and Chaitusaney S., Coordination of dispatchable distributed generation and voltage control devices for improving voltage profile by Tabu Search, 8th International Conference on Electrical Engineering/Electronics, Computer, Telecommunications and Information technology (ECTI-CON) (2011), 869-872). In general, the local optimum solution can be found using a simple approach based on gradient algorithms and a simplified liner model for the distribution grid 100, while the global optimum solution can be found using a detailed approach based on soft compute techniques and a full model for the distribution grid 100.

In another embodiment, once the global optimum solution for the incoming grid state is found, the solving subunit 206 is further configured to write the global optimum solution for the incoming grid state and the incoming grid state itself in the database 212 stored in the memory 210. In view of this, the database 212 can contain only the global optimum solutions for the different grid states.

Although the subunits of the control unit 108 have been described above as separate structural elements, each of which is configured to perform only one particular function, those skilled in the art should understand that the subunits can be combined in one or more processors, and, in this case, the control unit 108 can be implemented as a computing device having one or more processors and a memory, such as a laptop, on a stationary computer. In other embodiments, one or more of the subunits of the control unit 108 can be combined with each other so as to perform one or more of the above-mentioned or other functions (e.g., the monitoring subunit 200 can be combined with the determining subunit 202).

Figure 3:
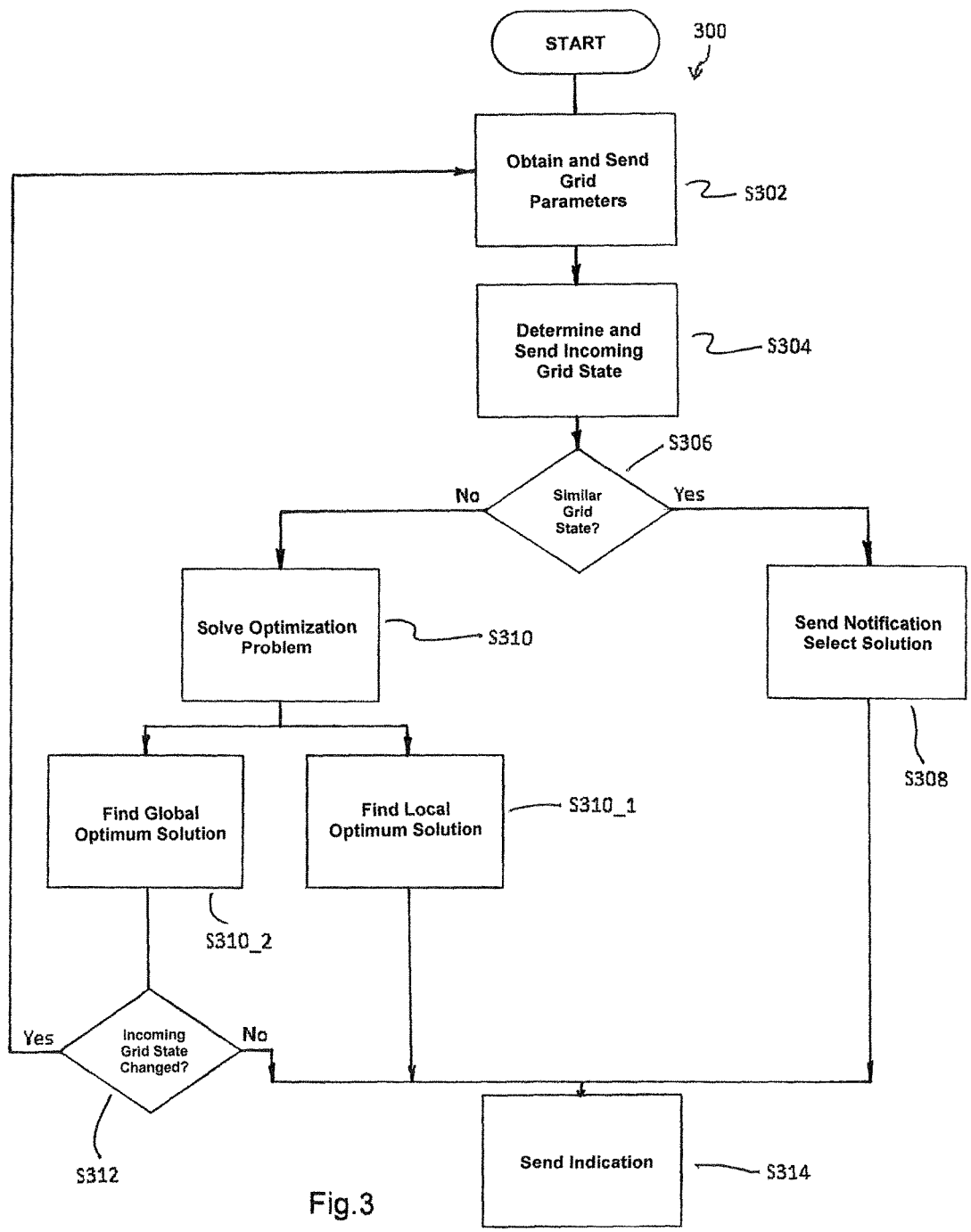
FIG. 3 illustrates a flow chart of a method for controlling power production in the distribution grid of FIG. 1 in accordance with an exemplary embodiment of the present invention.

FIG. 3 shown an exemplary sequence of steps indicating the operational principle of the control unit 108. The sequence of steps in FIG. 3 implements an exemplary method 300 for controlling power distribution in the distribution grid 100 in accordance with the present invention.

The method 300 begins at step S302. Here, the monitoring subunit 200 obtains the grid parameters, such as voltage amplitudes, the amount of power produced by one or more of the power producers 102, the amount of power consumed by one or more of the power consumers 104, and other grid parameters suitable for determining the incoming grid state. As stated above, the monitoring subunit 200 can combine the obtained parameters in the form of graphs and data tables, but other combination forms are also possible.

When the grid parameters are obtained, the monitoring subunit 200 sends these parameters to the determining subunit 202, and the method 300 proceeds to step S304, At this step, the determining subunit 202 determines the incoming grid state based on the obtained grid parameters. Such a determination is based on different known prognosis methods. One example of such a method is already given above when describing FIG. 2.

When the incoming grid state is determined, i.e., the set of future grid parameters is predicted, the determining subunit 202 send the information of the incoming grid state to the checking subunit 204, and the method proceeds to step S306. At this step, the checking subunit 204 checks whether the incoming grid state determined by the determining subunit 202 is similar to one or more previous grid states. For this purpose, the checking subunit 204 performs access to the database 212 stored in the memory 210 of the control unit 108. Here, the two following variants are possible.

If the check result is "YES", the checking subunit 204 notifies the solving subunit 206 that there is at least one previous solution in the database 212 which is similar to the incoming grid state determined by the determining subunit 202 at step S304, and the solving subunit 206 selects a respective solution for the at least one previous solution as a solution for the incoming grid state (step S308). When the solution for the incoming grid state is selected, the method 300 proceeds goes directly from step S308 to step S314, at which the sending subunit 208 sends the indication represented by the selected solution for the incoming grid state through the network 110 to one or more of the power producers 102 in the distribution grid 100.

However, if the check result is "NO", the checking subunit 204 notifies the solving subunit 206 that there are no similar previous grid states in the database 212, and the method proceeds from step S306 to step S310. At step S310, the solving subunit 206 solves an optimization problem in order to find a new solution for the incoming grid state. As shown in FIG. 3, this step of finding the new solution is divided into two substeps S310_1 and S310_2. At substep S310_1, the solving subunit 206 finds a local optimum solution for the incoming grid state determined at step S304. At substep S310_2, the solving subunit 206 finds a global optimum solution for the incoming grid state determined at step S304. The definitions of the local and global optimum solutions as well as methods by which the local and global optimum solutions can be obtained are already discussed above when describing FIG. 2. It should be noted that the substeps S310_1 and S310_2 can be performed by the solving subunit 206 in parallel or in sequence, depending on particular applications. As also stated above, the local optimal solution is found faster than the global optimum solution. It means that the power producers 102 will firstly follow the indication represented by the local optimum solution until the global optimum solution is found. When the local optimum solution is found, the solving subunit 206 sends it to the sending subunit 208, and the method proceeds further to step S314. In other words, the local optimum solution can be considered as a temporary solution while the global optimum solution is not found. When the global optimum solution is found, the method 300 goes from substep S310_2 to step S312. At step S312, the solving subunit 206 determines (e.g., by requesting the determining subunit 204 to re-determine the incoming grid state) whether or not the incoming grid state changed. Such a determination is desirable because the process of finding the global optimum solution usually takes a long time to finish and, during this time, the grid parameters can change, thereby resulting in changes to the incoming grid state. There are also two possible variants. If it is determined that the incoming grid state did not change during the process of finding the global optimum solution, the solving subunit 206 sends the global optimum solution to the sending subunit 208, and the method proceeds from step S312 to step S314 at which the sending subunit 208 sends the indication represented by the global optimum solution to one or more of the power producers 102 in the distribution grid 100, thereby replacing the previous indication represented by the local optimum solution. However, if it is determined that the incoming grid state changed during the process of finding the global optimum solution, the solving subunit 204 does not send the global optimum solution to the sending subunit 208, because the global optimum solution found by the solving subunit 206 is no longer true. In this case, the method returns to step S302.

It should be noted that the method 300 is not limited to the above-described sequence of steps S302-S314 and can include other additional steps.

In accordance with one embodiment, the method 300 can further comprise a step at which, when the new global optimum solution is found by the solving subunit 206 at step S310 2, the solving subunit 206 stores the incoming grid state and the new global optimum solution for the incoming grid state as a "state-solution" pair in the database 212 stored in the memory 210 of the control unit 108.

In accordance with another embodiment, the step of checking (step S306) comprises the step of searching for a similar previous grid state for the incoming grid state in the database 212 by using identifiers for the "state-solution" pairs (as described above with reference to FIG. 2).

A particular example will be now given, in which the method 300 for controlling power distribution in the distribution grid 100 is used. Under the assumption that the distribution grid 100 is an electrical grid with distributed photovoltaic generation and the power producers 102 are solar battery modules each provided with photovoltaic inverters, when there is a lot of solar irradiation in a first part of the distribution grid 100 and there is no solar irradiation (e.g., due to clouds) in a second part of the distribution grid 100ƒ it will result in different power generation levels in the parts of the distribution grid 100. In particular, the power generation level in the first part will be very high, while the power generation level in second part will be very low. Consequences of such different power generation levels can be opposite, e.g., the occurrence of voltage swells in the first part and the occurrence of voltage sags in the second part. In this case, i.e., when solar irradiation is non-uniform within the distribution grid 100, each photovoltaic inverter can be instructed by the control unit 108 (in particular, by the control information from the sending subunit 208) to provide a certain amount of power within each of said parts of the distribution grid 100. More specifically, the instructions for the inverters located in the first part (with a lot of solar irradiation) can consist in producing less power or in temporarily ceasing power production to compensate for voltage swells, while the instructions for the inverters located in the second part (with no solar irradiation), on the contrary, can consist in producing more power to compensate for the voltage sags. With such power production control, it is possible to achieve the power savings and the minimization of loss in the distribution grid.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. Further, the functionality associated with each of the illustrative logical blocks, modules, and circuits may be partially or fully subsumed by a different component, shown or not shown, in other embodiments.

Each of the above-described processors may be a microprocessor, but in the alternative, each processor may be any conventional processor, controller, microcontroller, or state machine. Each processor may also be implemented as a combination of computing devices, such as a combination of a DSP and a microprocessor, a plurality of microprocessors, one or more microprocessors in conjunction with a DSP core, or any other such configuration. In addition, for each of the embodiments described herein, the corresponding form of any such embodiments may be described herein as, for example, "logic configured to" perform the described action.

It will be appreciated that many of the various logical blocks, modules, circuits, and method steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. In addition, information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

In one or more exemplary embodiments, the functions described may be implemented in hardware, software, firmware, or any combination thereof. If implemented in software, the functions may be stored on or transmitted over as one or more instructions or computer program code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other media that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact discs (CDs), laser discs, optical discs, digital versatile discs (DVDs), floppy disks and blu-ray discs where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order, unless otherwise noted or required. Furthermore, although elements of the invention may be described or claimed in the singular, the plural is contemplated unless limitation to the singular is explicitly stated.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for controlling power production in a distribution grid including a plurality of power producers and a plurality of power consumers, the method comprising:
   determining, by a controller operatively connected to the distribution grid via a communications network, an incoming grid state based on a set of grid parameters, the controller comprising a monitoring module, a determining subunit, a checking subunit, a solving subunit, a sending subunit and a memory which stores a database composed of "state-solution" pairs, each pair of the "state-solution" pairs providing an indication of a previous grid state and a respective solution for the previous grid state, each respective solution representing an indication of an amount of power to be produced by the plurality of power producers to provide a desired power level for the plurality of power consumers in the distribution grid;
   checking, by the controller, whether an incoming grid state is similar to at least one previous grid state within the database;
   selecting, by the controller, a solution for the at least one previous grid state as a solution for the incoming grid state if the check indicates the incoming grid state is similar to the at least one previous grid state within the database; and
   sending, by the controller, an indication which is represented by the selected solution for the incoming grid state to the plurality of power producers.

2. The method of claim 1, wherein the set of grid parameters includes voltage amplitudes, amounts of produced power and amounts of consumed power.

3. The method of claim 1, wherein the plurality of power producers comprise solar battery modules provided with photovoltaic inverter; and
   wherein said sending the indication comprises sending, by the controller, the indication which is represented by the selected solution for the incoming grid state to each photovoltaic inverter.

4. The method of claim 1, wherein the solutions for previous grid states in the database are global optimum solutions.

5. The method of claim 4, wherein, if the check indicates the incoming grid state is not similar to the at least one previous grid state within the database, the method further comprising:
   finding, by the controller, a new local optimum solution for the incoming grid state using a simple approach; and
   finding, by the controller, a new global optimum solution for the incoming grid state using a detailed approach;
   wherein the simple approach is based on gradient algorithms and a simplified liner model for the distribution grid;
   wherein the detailed approach is based on soft compute techniques and a full model for the distribution grid; and
   wherein the new local optimum solution for the incoming grid state is found faster than the new global optimum solution for the incoming grid state, such that the indication which is represented by the new local solution for the incoming grid state is sent by the controller to each power producer of the plurality of power producers until the global optimum solution for the incoming grid state is found.

6. The method of claim 5, wherein said finding the new global and local optimum solutions are performed by the controller in parallel or in sequence.

7. The method of claim 5, further comprising:
   storing, by the controller, the incoming grid state and the new global optimum solution for the incoming grid state in the database stored within the memory of the controller when the new global optimum solution is found.

8. The method of claim 1, wherein each "state-solution" pair within the database is provided with a certain identifier; and
   wherein said checking comprises searching for a similar solution for the incoming grid state by using identifiers for the "state-solution" pairs within the database.

9. The method of claim 1, wherein said sending the indication is performed by the controller via one of wired and wireless communications.

10. An apparatus for controlling power production in a distribution grid including a plurality of power producers and a plurality of power consumers, the apparatus comprising:
    a processor operatively connected to the distribution grid via a communications network, the processor comprising a monitoring module, a determining subunit, a checking subunit, a solving subunit and a sending subunit; and
    memory connected to the processor and storing computer-readable program instructions which, when executed by the processor, cause the processor to:
    determine an incoming grid state based on a set of grid parameters, said memory further storing a database composed of "state-solution" pairs, each pair of the "state-solution" pairs providing an indication of a previous grid state and a respective solution for the previous grid state, each respective solution representing an indication of an amount of power to be produced by the plurality of power producers to provide a desired power level for the plurality of power consumers in the distribution grid;
    check whether an incoming grid state is similar to at least one previous grid state within the database;
    select a solution for the at least one previous grid state as a solution for the incoming grid state if the check indicates the incoming grid state is similar to the at least one previous grid state within the database; and
    send an indication which is represented by the selected solution for the incoming grid state to the plurality of power producers.

* * * * *